United States Patent [19]
Olson

[11] 3,750,516
[45] Aug. 7, 1973

[54] MULTIPLE KEYBOARD APPARATUS
[76] Inventor: Percy Dean Olson, Rt. 4, Oakview Dr., Owatonna, Minn.
[22] Filed: Dec. 14, 1970
[21] Appl. No.: 97,736

[52] U.S. Cl. .................................. 84/470, 84/174
[51] Int. Cl. ...................... G09b 15/00, G10c 1/00
[58] Field of Search ................... 84/174, 175, 176, 84/177, 470; 108/115, 113

[56] References Cited
UNITED STATES PATENTS
3,695,138   10/1972   Andersen ............................ 84/470
3,478,159   11/1969   Olson ................................. 84/176 X
3,101,064    8/1963   Kanzelberger et al. ............ 108/113

OTHER PUBLICATIONS
"The Instrumentalist," Vol. 5, No. 1, September, 1950, pages 26 and 27.

Primary Examiner—Richard B. Wilkinson
Assistant Examiner—John F. Gonzales
Attorney—Burd, Braddock & Bartz

[57] ABSTRACT

A transportable multiple keyboard instrument having two pivotally connected keyboard units. Each unit has a plurality of keyboards connected to an electronic sound producing system. Folding leg structure supports the keyboard units in a generally horizontal playing position and a folded upright position. Each keyboard unit has a fold open housing for access into the interior of the housing. The leg structure has end legs and a center leg supporting the units in the horizontal playing position and the folded transport position.

30 Claims, 9 Drawing Figures

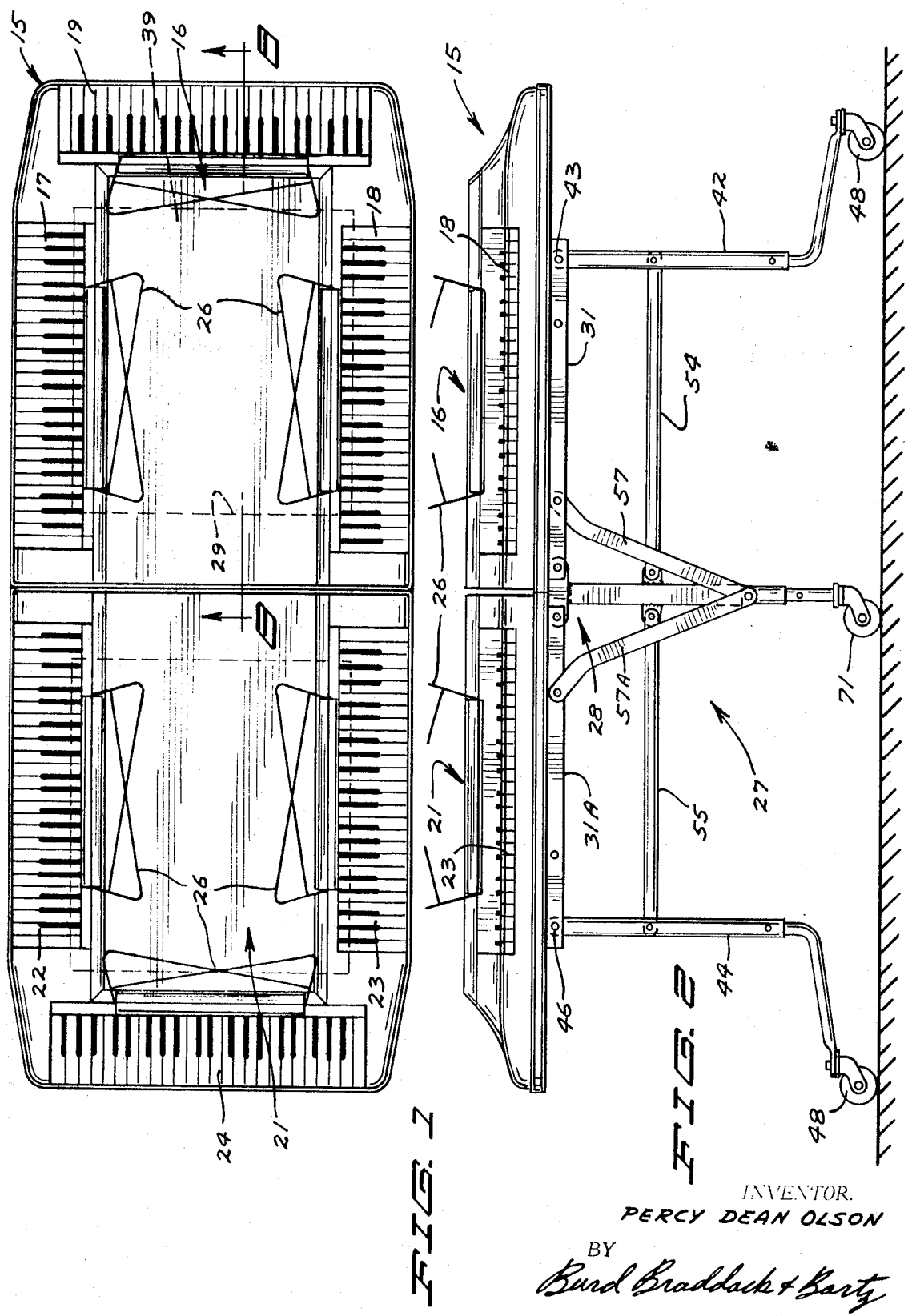

Patented Aug. 7, 1973

INVENTOR.
PERCY DEAN OLSON
BY
Burd Braddock & Bartz
ATTORNEYS

Patented Aug. 7, 1973
3,750,516
3 Sheets-Sheet 3
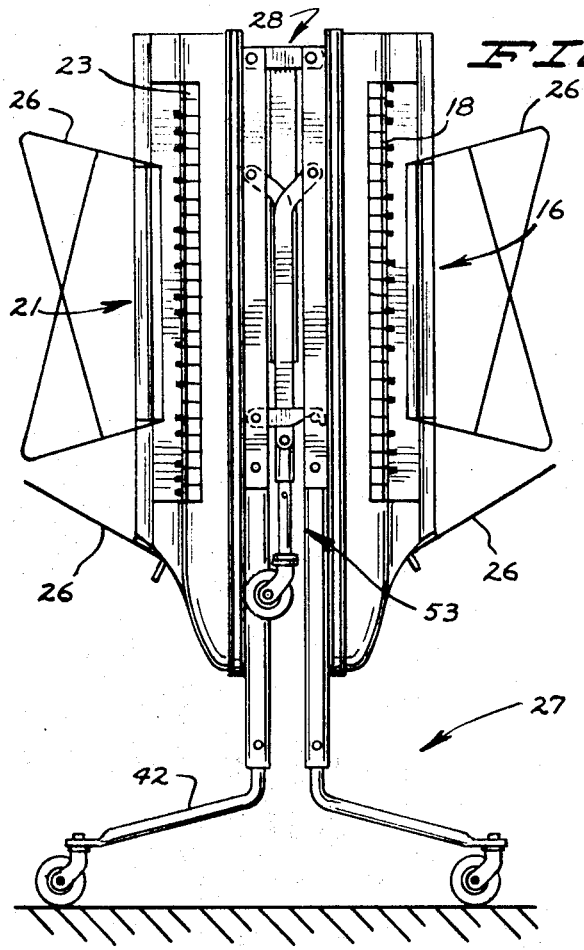
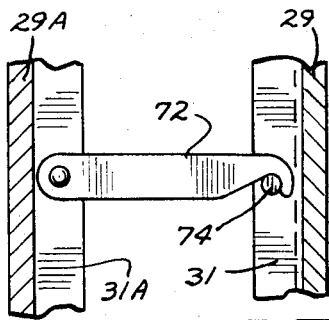
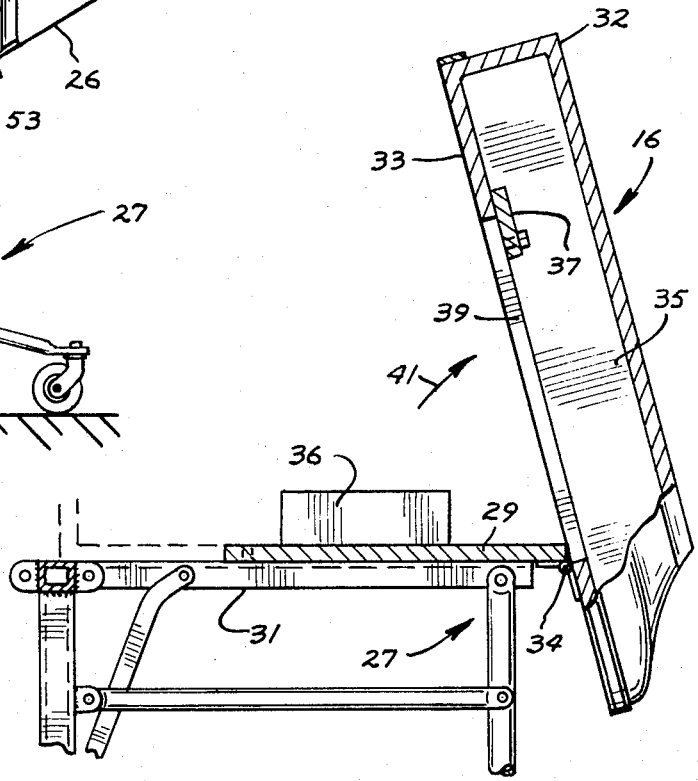
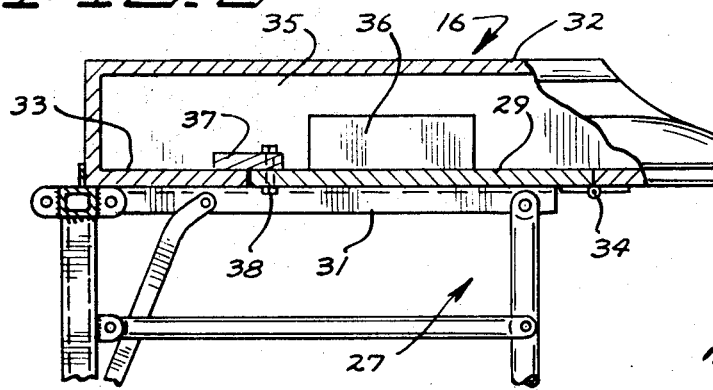
INVENTOR.
PERCY DEAN OLSON
BY
Burd Braddock & Bartz
ATTORNEYS

MULTIPLE KEYBOARD APPARATUS

BACKGROUND OF THE INVENTION

Electronic pianos and organs have been used in groups as teaching aids. These teaching aids have separate keyboards and sound producing units. These instruments are not foldable or readily transported from place to place. A multiple keyboard teaching aid has been developed which can be folded and transported. This instrument has a plurality of keyboards carried in pivotally connected enclosures. Leg structure supports the instrument at a playing height above the floor. This instrument is disclosed in U.S. Pat. No. 3,478,159.

SUMMARY OF THE INVENTION

The invention relates to a foldable multiple keyboard apparatus that has a number of separate keyboards that can be played individually or simultaneously. Each keyboard unit has a base means carrying a housing having a chamber for accommodating an electronic sound producing system and circuitry of the instrument. The housing is pivotally mounted on a portion of the base so that it can be moved to a position to permit access to the chamber. A releasable lock secures the housing means to the base.

The keyboard teaching apparatus is carried on folding leg structure having a plurality of leg means connected to the keyboard units. The leg means selectively support the keyboard units in a first generally horizontal playing position and a second generally upright transport position. One of the leg means has a biasing means to yieldably control the pivotal movement of the units relative to each other so that the units can be easily folded and unfolded.

IN THE DRAWINGS

FIG. 1 is a top plan view of a multiple keyboard apparatus of the invention with the keyboard units located in the horizontal playing position;

FIG. 2 is a side elevational view of FIG. 1;

FIG. 6 is a side elevational view of the multiple keyboard apparatus folded in the transport position;

FIG. 7 is an enlarged side view showing the lock structure holding the keyboard units in the folded position;

FIG. 8 is an enlarged sectional view taken along the line 8—8 of FIG. 1; and

FIG. 9 is a sectional view similar to FIG. 8 showing the keyboard housing in the open position.

Figure 3:
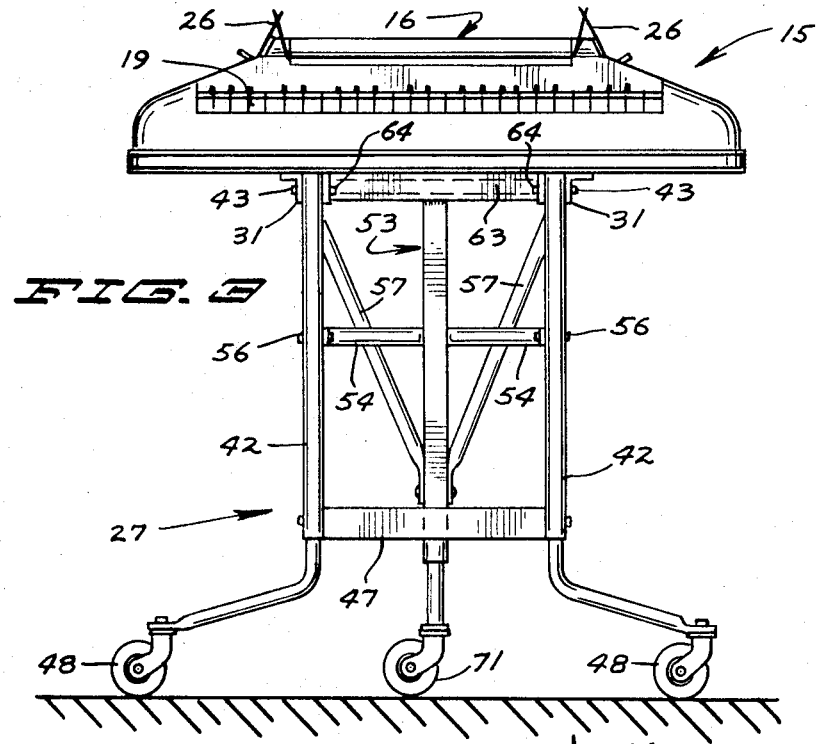
FIG. 3 is an end elevational view of FIG. 1.

Referring to the drawing, there is shown in FIGS. 1 and 2 the keyboard teaching apparatus or instrument of the invention, indicated generally at 15, for teaching music to a plurality of students. The apparatus 15 has a first keyboard unit 16 having side keyboards 17 and 18 and an end keyboard 19. Each keyboard has a plurality of keys. In the preferred structure, 44 keys are provided so that more than three octaves can be played. Located in longitudinal alignment with the first keyboard unit 16 is a second keyboard unit 21. Unit 21 is virtually identical with the unit 16 and has side keyboards 22 and 23 and an end keyboard 24. Extended upwardly and inwardly from each of the keyboards is a support, stand or music rack 26 for sheet music and the like. The supports 26 are pivotally mounted on the unit so that they can be folded down against the keyboards when the apparatus is folded to its upright transport and storage position. Control panels in front of each keyboard have jack receptacles adapted to be connected to earphones used by the students. Recorded instructional material can be introduced into the earphones as the student plays. The instructor can monitor and communicate with the student through the earphones.

The units 16 and 17 are supported on a foldable leg assembly, indicated generally at 27. The mid-portion of the leg assembly has pivot structure 28 pivotally connecting adjacent portions of the units 16 and 21 in end-to-end relationship. As shown in FIGS. 2 and 3, the leg assembly 27 supports the keyboard units 16 and 17 in a horizontal position locating the keyboards at an elevation or height convenient for playing by students. FIG. 6 shows the leg assembly 27 supporting the keyboard in folded upright transport position.

Referring to FIGS. 8 and 9, there is shown the keyboard unit 16 supported on the leg assembly 27. The unit 16 has a generally horizontal base member 29 secured to a pair of generally longitudinal frame members 31. Base member 29 is a flat sheet, as plywood or the like. Leg assembly 27 is pivotally connected to the frame members 31. Frame members 31 can be elongated rails or angle members pivotally connected to the pivot structure 28. Positioned over the base member 29 is a casing or housing 32 having a floor or bottom wall 33 surrounding the base member 29. Housing 32 has a one piece top with side and end recesses for the keyboards. The top can be a one piece molded plastic member. The housing 32 is pivotally mounted on the outer end of the base member 29 with a transverse hinge 34 which permits the housing to move to an open position to provide access into the housing chamber 35 to inspect and repair the electronic components of the sound producing system 36 as well as the keyboard and the circuits connecting the keyboard with the electronic sound producing system. The electronic components are located in the housing that is mounted on the base member 29. An example of a sound producing system usable in this keyboard teaching apparatus is shown in U. S. Pat. No. 3,478,159.

A transverse plate 37 is secured to the bottom wall 33 of the housing. The plate 37 has a portion that extends over the inside edge of the base member 29 to function as a stop and an anchor for lock bolts 38. Bolts 38 extend through base member 29 and into a nut mounted on the plate 37 to releasably lock the housing 32 to the base member 29. When the lock bolts 38 are removed the housing 32 can be pivoted upwardly in the direction of arrow 41 to the open position, as shown in FIG. 9. The opening 39 in the bottom wall 33 provides convenient access to the chamber 35. The leg assembly 27 maintains the base member 29 in the general horizontal position. The entire housing can be removed from the base member by disconnecting the hinge 34 and the electronic circuitry connecting the sound producing system 36 with the keyboards.

Returning to FIGS. 2, 3 and 5, leg assembly 27 comprises a first pair of downwardly extended legs 42 connected with pivots 43 to the outer ends of the frame members 31. Located on the opposite end of the keyboard teaching apparatus is a second pair of downwardly directed legs 44 connected to the frame members 31A with pivots 46. As shown in FIG. 3, each pair of legs has a cross member 47. Each leg has a caster wheel 48 attached to a generally upright arm 49.

Figure 4:
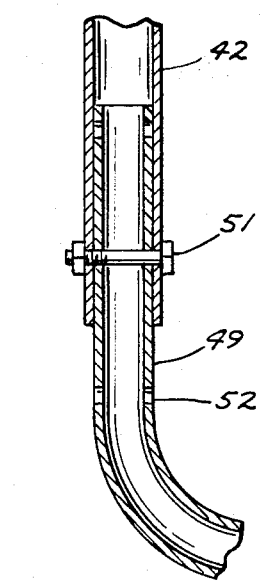
FIG. 4 is an enlarged sectional view of a portion of the end leg of FIG. 3 supporting the keyboard unit.

As shown in FIG. 4, arm 49 telescopes up into the bottom end of the leg 42. A bolt 51 is used to fix the position of the arm 49 relative to the leg 42. Arm 49 has a second hole 52 which permits adjustment of the length of the leg so that the playing height of the keyboard can be adjusted to accommodate the students.

The mid-portion of the leg assembly 27 has a downwardly directed third or center leg assembly 53 connected to the first and second pair of end legs with generally horizontal braces 54 and 55. Pivots 56 connect opposite ends of the braces to an ear secured to the center leg assembly and the mid-portions of the end legs. The lower portion of the center leg assembly 53 is connected to the frame members 31 and 31A with upwardly and outwardly directed struts 57. Pivot 58 connects the strut 57 to the frame member 31. In similar manner, pivot 59 connects the strut 57A to the frame member 31A.

Figure 5:
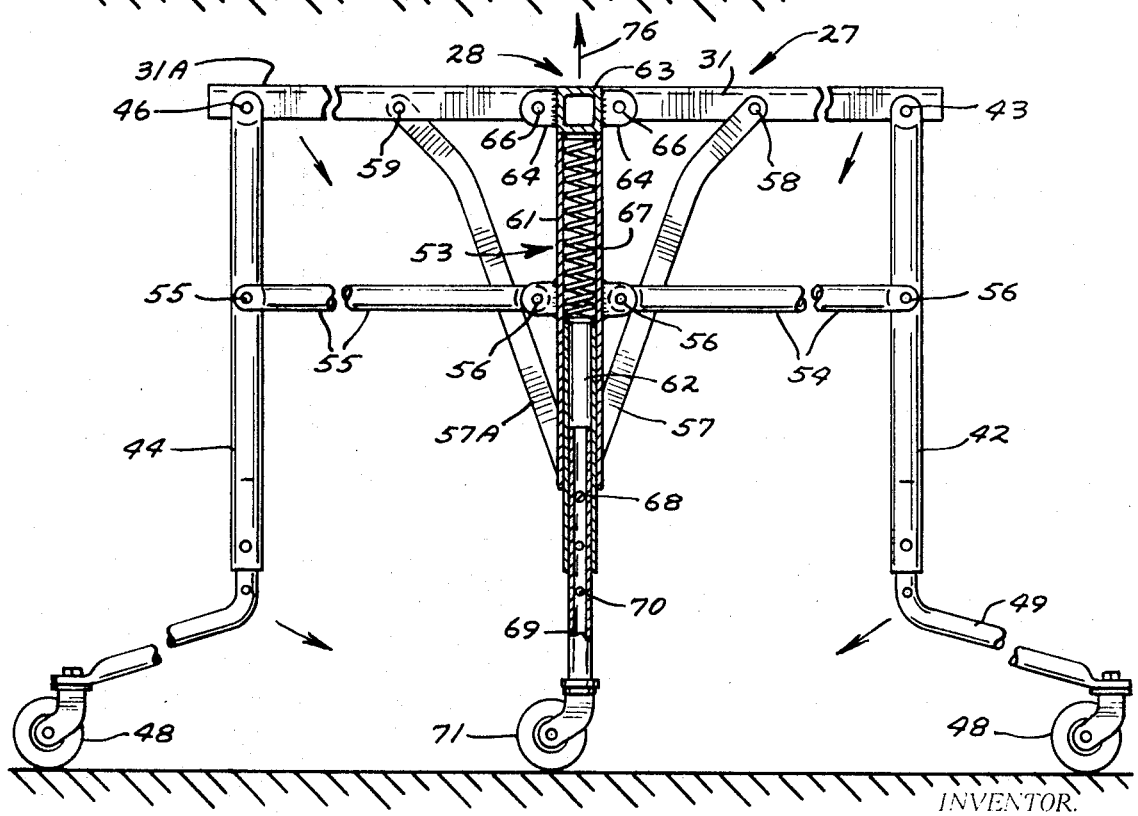
FIG. 5 is a fragmentary elevational view, partly sectioned, of the leg assembly supporting the keyboard units.

As shown in FIG. 5, the third leg assembly 53 comprises a first fixed downwardly directed tubular member 61 having an upper end secured to a transverse member 63 of the pivot structure 28. Pivot structure 28 includes in addition to the transverse member 63 longitudinally directed ears 64 carrying pivots 66 connecting the inner ends of the frame members 31 and 31A to the pivot structure. Slidably positioned in the lower end of member 61 is a second tubular member 62. The member 62 adjustably carries a downwardly directed arm 69 secured to a ground engaging caster wheel 71. A pin 68 attaches the lower ends of the struts 57 and 57A and the arm 69 to the slidable tubular member 62. The arm 69 has a second hole 70 whereby the length of the third leg assembly can be adjusted. Located within the tubular member 61 is a coil spring 67 which biases the second member 62 downwardly or out of the member 61. When the frame members 31 and 31A are in the generally horizontal position, as shown in FIG. 5, the coil spring 67 is under compression as the struts 57 and 57A move the member 62 to its "up" position relative to the member 61.

FIG. 6 shows the keyboard units 16 and 21 being supported by the leg assembly 27 in an upright folded position. The keyboard units are locked in the folded position with a bar 72 having a hook. One end of bar 72 is pivotally secured to base member 29A of unit 21. The hook cooperates with a rod attached to the base member 29 of unit 16. The hook must be released before the units 16 and 21 can be moved to their horizontal positions. In the folded position the center leg assembly 53 is extended and located between the units 16 and 21. The operation of the leg assembly is best seen in FIG. 5. On moving the apparatus from a generally horizontal playing position to the upright folded position, the mid-portion of the leg assembly 27 and pivot structure 28 move upwardly, as shown by arrow 76. The frame members 31 and 31A move from the generally horizontal position to an upright position. This moves the struts 57 and 57A downwardly carrying the second member 62 out of the first tubular member 61. The spring 67 being under compression aids in the folding movement of the leg assembly. The outer pairs of legs 42 and 44 move inwardly and pivot relative to the frame members 31 and 31A so that they support the entire apparatus when the center leg assembly moves away from the floor. As the units 16 and 21 approach the upright transport and storage position, as shown in FIG. 6, the hook 73 will automatically engage the rod 74 to hold the units in this position. When the hook 73 is released, the units 16 and 21 can be moved down and to the horizontal position. The struts 57 and 57A move upwardly moving member 62 up against the biasing force of the spring 67. The biasing force of spring 67 is sufficient to prevent the units from folding open without additional force. This makes the opening and closing of the apparatus always under the control of the operator.

The teaching apparatus has been shown and described to have six separate keyboards located on a pair of pivotally connected keyboard units. Each keyboard unit can have additional keyboards to accommodate additional students. The length of the keyboard unit can be increased to add additional side keyboards to each unit. An example of this structure is shown in my copending U.S. Pat. application Ser. No. D–26,453, filed Dec. 14, 1970.

The embodiments of the invention in which an exclusive property or privilege is claimed are defined as follows:

1. A keyboard unit comprising: base means, leg means attached to the base means supporting the base means in a generally horizontal position, housing means having a chamber located over the base means, a plurality of separate keyboards mounted on said housing means and projected into said chamber, said keyboards having keys exposed to the outside of said housing means, means pivotally connecting a portion of the housing means adjacent and generally parallel to one of the keyboards to the base means whereby the housing means can be moved relative to said base means to permit access into the chamber, and means to lock said housing means to said base means.

2. The keyboard unit of claim 1 wherein: said plurality of separate keyboards includes a transverse keyboard on the outer end of said housing means, said means pivotally connecting a portion of the housing means being located adjacent and generally parallel to said transverse keyboard.

3. The keyboard unit of claim 1 wherein: the means pivotally connecting a portion of the housing means to the base means is a transverse hinge secured to the base means and the housing means.

4. The keyboard unit of claim 1 wherein: the housing means has a bottom wall with an opening open to the chamber, said base means being of a size and shape to close said opening when the housing means is locked to said base means.

5. The keyboard unit of claim 1 wherein: said keyboards comprise side keyboards and an end keyboard.

6. The keyboard unit of claim 1 wherein: said housing means has a one piece top wall having recesses to accommodate the keyboards.

7. The keyboard unit of claim 1 including: a sound producing system coupled to the keyboards and mounted on the base means.

8. A multiple keyboard apparatus comprising: a first keyboard unit having a base, housing means located over the base, and a plurality of keyboards having keys exposed to the outside of said housing means; a second keyboard unit having a base, second housing means located over said base, and a plurality of keyboards having keys exposed to the outside of said second housing means; first elongated generally longitudinal frame means secured to the base of the first keyboard unit, second elongated generally longitudinal frame means secured to the base of the second keyboard unit, transverse pivot means pivotally connecting the first frame means to the second frame means for selective movement of said first and second keyboard units to a first generally horizontal position and to a second generally upright back-to-back position with the keys on the outsides of the apparatus, and a plurality of leg means connected to the first and second frame means and pivot means to support said keyboard units in said first and second positions.

9. The apparatus of claim 8 wherein: said leg means comprise first leg means movably connected to the first frame means, second leg means movably connected to the second frame means, third leg means connected to the pivot means, brace means connecting the first leg means with the third leg means and the second leg means with the third leg means whereby the first, second and third leg means support the units in the first position and the first and second leg means support the units in the second position.

10. The apparatus of claim 8 including: biasing means associated with said plurality of leg means to yieldably control the pivotal movement of said units.

11. The apparatus of claim 8 wherein: said leg means comprise first leg means movably connected to the first frame member, second leg means movably connected to the second frame member, third leg means connected to the means pivotally connecting the first frame member with the second member, brace means connecting the first leg means with the third leg means and second leg means with the third leg means whereby the first, second and third leg means support the keyboard units in the first position and the first and second leg means support the keyboard units in the second position, and biasing means located within said third leg means to yieldably control the pivotal movement of said keyboard units.

12. The apparatus of claim 11 wherein: said third leg means has a first tubular member and a second member telescoped into the first tubular member, said biasing means includes spring means within the first tubular member to bias the second member out of the first member and strut means connecting the second member to the first frame member and the second frame member.

13. The apparatus of claim 8 including: releasable latch means connected to the first frame means and second frame means to hold the keyboard units in the second position.

14. The apparatus of claim 8 including: pivot means connecting the housing means to the adjacent bases and releasable lock means for holding said housing means on said bases.

15. The apparatus of claim 8 wherein: the plurality of leg means comprise first leg means pivotally connected to an outer end portion of the first frame means, second leg means pivotally connected to an outer end portion of the second frame means, and third leg means fixed to the transverse pivot means and spaced substantially the same distance from the first leg means and the second leg means, first brace means located generally below the first frame means pivotally connected to the first leg means and third leg means, second brace means located generally below the second frame means pivotally connected to the second leg means and the third leg means, said first and second brace means being located in a generally common horizontal plane when the first and second frame means are in the first generally horizontal position.

16. A multiple keyboard apparatus comprising: a first keyboard unit having first base means, first housing means located over the first base means, a plurality of separate first keyboards mounted within the first housing means, each of said first keyboards having keys exposed to the outside of the first housing means; a second keyboard unit having second base means, second housing means located over the second base means, a plurality of separate second keyboards mounted within the second housing means, each of said second keyboards having keys exposed to the outside of the second housing means; frame means carrying said first and second keyboard units, said frame means having a pair of first elongated generally horizontal frame members and a pair of second elongated generally horizontal frame members, transverse means pivotally connecting the first frame members to the second frame members whereby the first and second frame members can be selectively moved to a first generally horizontal end-to-end position and to a second generally upright side-by-side position, said first keyboard unit mounted directly on at least one of the pair of first members and said second keyboard unit mounted directly on at least one of the pair of second members, and a plurality of leg means connected to each of the members of the frame means to selectively support said keyboard units in a first generally horizontal position and in a second generally upright back-to-back position with the keys on the outside of the apparatus.

17. The apparatus of claim 16 wherein: said plurality of leg means comprise first leg means connected to outer end portions of the pair of first elongated frame members, second leg means connected to outer end portions of the pair of second elongated frame members and third leg means located between the first and second leg means operably connected to said pair of first and second elongated frame members.

18. The apparatus of claim 16 wherein: the first housing means is of a size to cover the entire first base means, and the second housing means is of a size to cover the entire second base means.

19. The apparatus of claim 16 wherein: the leg means include legs having outwardly directed portions, wheel means mounted on said portions, said wheel means being located outwardly of the outside upright planes of the first and second keyboard units when the first and second keyboard units are in the upright back-to-back position.

20. A multiple keyboard apparatus comprising: a first keyboard unit having first housing means with at least one keyboard having keys exposed to the outside of the housing means; a second keyboard unit having second housing means with at least one keyboard having keys exposed to the outside of the second housing means; frame means carrying said first and second keyboard units; said frame means having a first elongated generally horizontal frame section and a second elongated generally horizontal frame section; transverse means pivotally connecting the first frame section to the second frame section whereby the first and second frame sections can be moved from generally horizontal positions to generally upright side-by-side positions; said first keyboard unit mounted on the first section and said second keyboard unit mounted on the second section; and a plurality of leg means connected to each section of the frame means to selectively support said keyboard units in a first generally horizontal position and in a second generally upright back-to-back position with the keys on the outsides of the apparatus, said leg means having first leg means movably connected to the first section, second leg means movably connected to the second frame section, third leg means connected to the transverse means, brace means connecting the first leg means with the third leg means and the second leg means with the third leg means whereby the first, second and third leg means support the keyboard units in the first generally horizontal position and the first and second leg means support the keyboard units in the second upright back-to-back position.

21. A multiple keyboard apparatus comprising: a first keyboard unit having first housing means with at least one keyboard having keys exposed to the outside of the first housing means; a second keyboard unit having second housing means with at least one keyboard having keys exposed to the outside of the second housing means; frame means carrying said first and second keyboard units; said frame means having a first elongated generally horizontal frame section and a second elongated generally horizontal frame section; transverse means pivotally connecting the first frame section to the second frame section whereby the first and second frame sections can be moved from generally horizontal positions to generally upright side-by-side positions; said first keyboard unit mounted on the first section and said second keyboard unit mounted on the second section; a plurality of leg means connected to each section of the frame means to selectively support said keyboard units in a first generally horizontal position and in a second generally upright back-to-back position with the keys on the outsides of the apparatus, and releasable lock means attached to the frame means for holding the keyboard units in the second generally upright back-to-back position.

22. The apparatus of claim 21 wherein: said plurality of leg means comprise first leg means connected to outer end portions of the pair of first elongated frame members, second leg means connected to outer end portions of the pair of second elongated frame members and third leg means located between the first and second leg means operably connected to said pair of first and second elongated frame members.

23. The apparatus of claim 21 wherein: a plurality of separate keyboards are mounted within the housing means of each keyboard unit, each of said keyboards having keys exposed to the outside of the housing means of each keyboard unit.

24. The apparatus of claim 21 wherein: the leg means include legs having outwardly directed portions, wheel means mounted on said portions, said wheel means being located outwardly of the outside upright planes of the first and second keyboard units when the first and second keyboard units are in the upright back-to-back position.

25. A multiple keyboard apparatus comprising: a first keyboard unit having first housing means with at least one keyboard having keys exposed to the outside of the first housing means; a second keyboard unit having second housing means with at least one keyboard having keys exposed to the outside of the second housing means; frame means carrying said first and second keyboard units; said frame means having a first elongated generally horizontal frame section and a second elongated generally horizontal frame section; transverse means pivotally connecting the first frame section to the second frame section whereby the first and second frame sections can be moved from generally horizontal positions to generally upright side-by-side positions; said first keyboard unit mounted on the first section and said second keyboard unit mounted on the second section; and a plurality of leg means connected to each section of the frame means to selectively support said keyboard units in a first generally horizontal position and in a second generally upright back-to-back position with the keys on the outsides of the apparatus, said plurality of leg means having first leg means pivotally connected to an outer end portion of the first frame section, second leg means pivotally connected to an outer end portion of the second frame section, and third leg means fixed to the transverse means and spaced substantially the same distance from the first leg means and second leg means, first brace means located generally below the first frame section pivotally connected to the first leg means and the third leg means, second brace means located generally below the second frame section pivotally connected to the second leg means and the third leg means, said first and second brace means being located in a generally common horizontal plane when the frame means is in the first generally horizontal position.

26. A multiple keyboard apparatus comprising: a first keyboard unit having a first base means, first housing means located over and covering the first base means, a plurality of separate first keyboards mounted within the first housing means, each of said first keyboards having keys exposed to the outside of the first housing means; a second keyboard unit having a second base means, second housing means located over and covering the second base means, a plurality of separate second keyboards mounted within the second housing means, each of said second keyboards having keys exposed to the outside of the second housing means; frame means carrying said first and second keyboard units; said frame means having a first elongated frame section secured to the first base means and a second elongated frame section secured to the second base means; pivot means movably connecting the first frame section to the second frame section whereby the first and second frame sections can be selectively moved to a first generally horizontal end-to-end position and to a second generally upright side-by-side position; and a plurality of leg means connected to the frame means to selectively support said keyboard units in a first generally horizontal position and in a second generally upright back-to-back position with the keys on the outside of the apparatus.

27. The multiple keyboard apparatus of claim 26 wherein: the first frame section and the second frame section each have a pair of elongated frame members.

28. The multiple keyboard apparatus of claim 26 wherein: the leg means comprise first leg means connected to the first frame section, second leg means connected to the second frame section, and third leg means located between the first and second leg means and connected to the first and second frame sections.

29. The apparatus of claim 26 including: first means for securing the first housing means to the first base means and second means for securing the second housing means to the second base means.

30. The apparatus of claim 26 wherein: the leg means include legs having outwardly directed portions, wheel means mounted on said portions, said wheel means being located outwardly of the outside upright planes of the first and second keyboard units when the first and second keyboard units are in the upright back-to-back position.

* * * * *